United States Patent [19]
Van Antwerp

[11] 3,728,851
[45] Apr. 24, 1973

[54] ELECTRIC CIRCUIT FOR HARVESTER AUTOMATIC HEADER CONTROL

[76] Inventor: Ferne R. Van Antwerp, Rural Route No. 1, Unionville, Iowa 52594

[22] Filed: Oct. 12, 1971

[21] Appl. No.: 188,380

Related U.S. Application Data

[63] Continuation-in-part of Ser. No. 645,740, June 13, 1967, Pat. No. 3,611,686.

[52] U.S. Cl. ................................56/208, 56/DIG. 15
[51] Int. Cl. ...............................................A01d 67/00
[58] Field of Search .............. 56/10.4, 10.8, 208–217, 56/DIG. 15

[56] References Cited

UNITED STATES PATENTS

| 3,222,851 | 12/1965 | Schnaidt et al. ................ 56/DIG. 15 |
| 3,566,587 | 3/1971 | Janssen .......................... 56/208 X |
| 3,286,448 | 11/1966 | Moore ............................. 56/208 |

Primary Examiner—Louis G. Mancene
Assistant Examiner—J. A. Oliff
Attorney—H. Robert Henderson et al.

[57] ABSTRACT

An electrical circuit for automatically controlling the height of the header of a harvester has a single manual control that has a RAISE position, a HOLD position, and an AUTOMATIC position. In the AUTOMATIC position, a multiple contact sensing switch is connected in the circuit to determine height, and a height control switch connected to the sensing switch provides a choice of height. In both the RAISE and HOLD positions, the sensing circuit is effective to maintain the header a sufficient distance above the ground to prevent damage to the cutting head of the harvester.

4 Claims, 5 Drawing Figures

Patented April 24, 1973

INVENTOR.
FERNE R. VAN ANTWERP
BY Glenn H. Antrim
Attorney

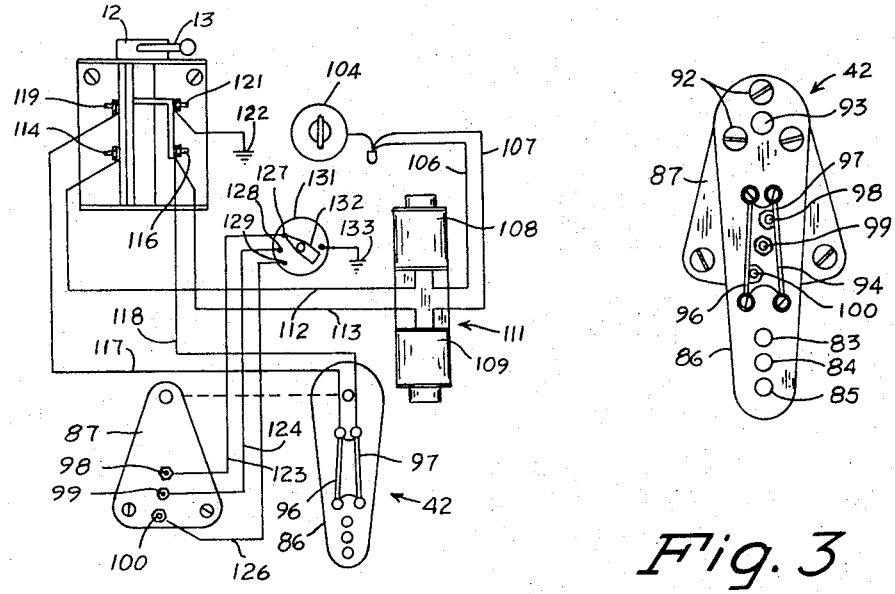
Fig. 2
Fig. 3
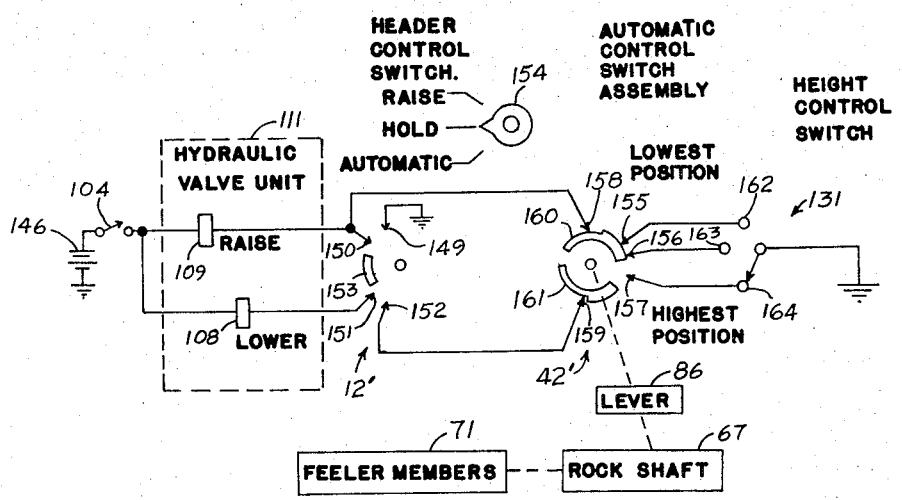
Fig. 5
INVENTOR
FERNE R. VAN ANTWERP
BY Glenn H. Antrim
Attorney

ELECTRIC CIRCUIT FOR HARVESTER AUTOMATIC HEADER CONTROL

BACKGROUND OF THE INVENTION

This application is a continuation-in-part of the application Automatic Header Control Apparatus, Ser. No. 645,740, filed 6-13-70 and issued as U.S. Pat. No. 3,611,686 on Oct. 12, 1971.

This invention pertains to electrical control circuits for automatically regulating the height of the cutting head of a harvester.

Control circuits for regulating the height of the cutting head of a harvester have provisions for manually raising the cutting head to a desired height for transportation or for field operation and also have provisions for connecting a sensing switch into an electrical circuit for automatically controlling the height of the cutting head. When the operator is using the harvester after the height of the cutting head has been adjusted manually, the cutting head may unexpectedly approach ground or an object that protrudes farther above the general contour of the ground than expected.

SUMMARY OF THE INVENTION

An object of the present invention is to prevent damage to the cutting head of a harvester by providing control to raise the head of the harvester automatically sufficiently at all times during its operation to clear any unseen obstacles above the general contour of the ground.

The contacts of a manual header control switch are connected to the contacts of a sensing switch for determining the height of a cutting head. The sensing switch in response to change in height of he header engages in sequence a plurality of contacts that are connected to a height control switch. The height control switch can therefore be set to determine within a predetermined range the height that the cutting head will be spaced above the ground when the manual header control switch is set in an AUTOMATIC position. In the AUTOMATIC position, the header can either be raised or lowered automatically as required. The header control switch is placed in a RAISE position to raise the header above that position automatically determined by the setting of the height control switch. When the header has been raised to the desired height by manual control, the header control switch is operated to a HOLD position and the header will usually be maintained at the height to which it has been raised. However, according to the present circuit, the portion of the automatic control circuit that controls the raising of the header is always connected in the circuit for operation whenever the harvester is in use. This improvement prevents damage to the cutting head by always automatically raising the cutting head above unseen and unexpected obstructions. When the cutting head is to be lowered from the position to which it has been operated by manual control, the header control switch is operated to the AUTOMATIC position until the header is lowered to any desired position providing it is not below the distance determined by the setting of the height control switch.

BRIEF DESCRIPTION OF THE DRAWING

FIG. 2 is a pictorial diagram of the control circuit of this invention;

FIG. 3 is a plan view of the sensing control switch shown in FIG. 2;

FIG. 5 is a complete schematic diagram of the circuit shown in FIG. 2.

DESCRIPTION OF THE PREFERRED EMBODIMENT

Figure 1:
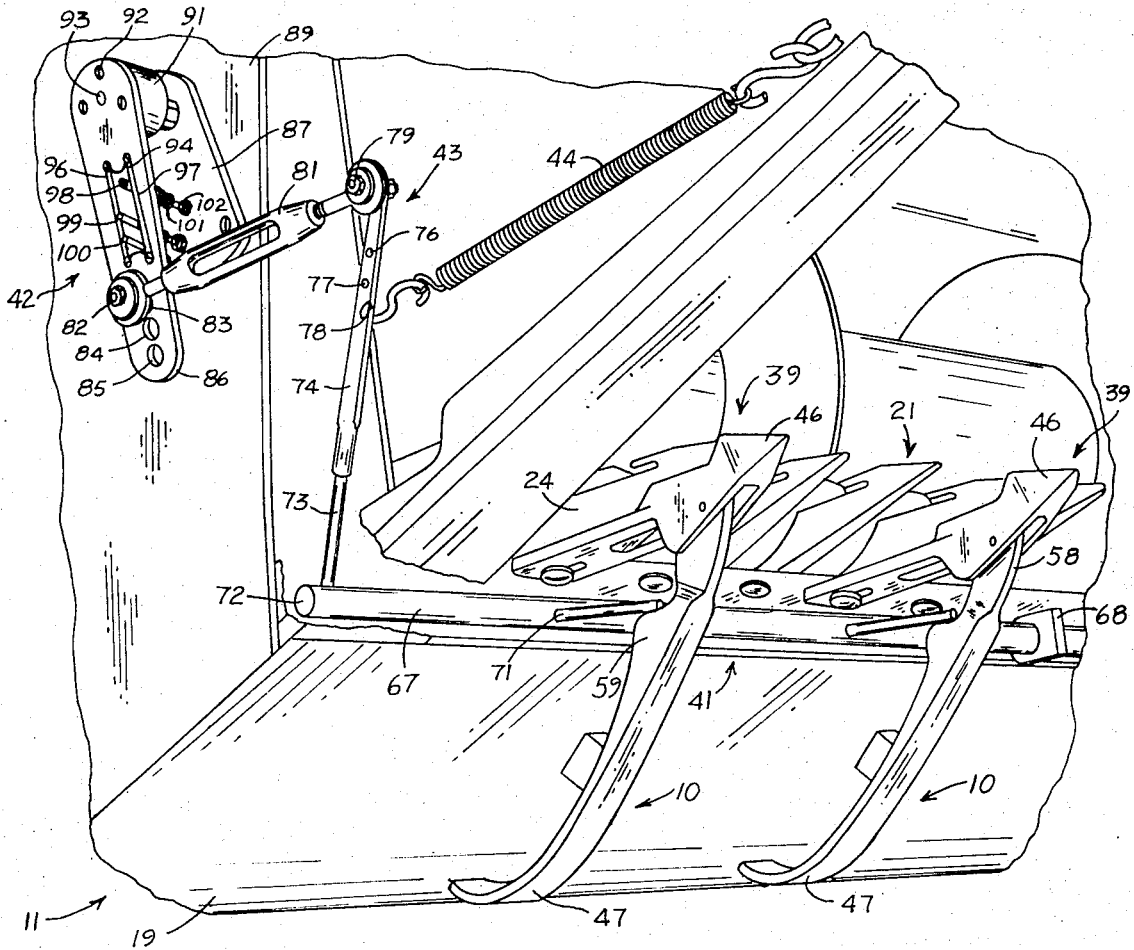
FIG. 1 is a fragmentary, perspective view of a portion of the front of the harvester, showing automatic header control apparatus for actuating the sensing control switch in the circuit of this invention.

Referring now to the drawings, the automatic header control apparatus of this invention is indicated generally at 10 in FIG. 1, shown assembled to the header unit 11 of a harvester machine. Conventional hydraulically operable piston and cylinder devices (not shown) are secured between the frame of the machine and the pivotally mounted header unit 11 for raising the lowering the header. The header unit 11 includes a grain pan 19 having a conventional cutter bar unit 21 secured to its front edge.

The automatic header control apparatus 10 of this invention comprises basically one or more ground engageable sensors 39, each sensor 39 vertically movable in direct response to its engagement with the ground; a sensor follower assembly indicated generally at 41 engageable with one or more of the sensors 39; and electric switch assembly 42 electrically connected to a header master control switch 12 (FIG. 2) to control the position of the follower assembly 41; a linkage assembly indicated generally at 43 which is connected between the switch assembly 42 and the follower assembly 41 for transmitting movement of the latter to the former; and a spring 44 connected between a portion of the header unit 11 and the linkage assembly 43 for maintaining the follower assembly 41 in following engagement with at least one of the sensors 39. Each of the sensors 39 comprise a guard attachment 46 and a ground follower 47 pivotally attached to the front portion of the attachment 46.

The sensor follower assembly 41 includes a straight elongated rock shaft 67 which is rotatably mounted in a plurality of bearing blocks 68 that are secured in a line below the rear portion of the cutter guard 24. At each sensor 39, a follower pin 71 is secured to the rock shaft 67 for a light, sensitive engagement with a lift projection 59 that extends rearwardly from the upper portion of the ground follower 47 a short distance below the point where it is pivoted to the guard attachment 46.

An actuation arm 73 extends radially from one end 72 of the rotatable rock shaft 67 and is connected to an elongated lever 74 that has for adjustment purposes a plurality of holes 76–78 rear its upper end. The lever 74 is pivotally connected at its upper end 79 to one end of turnbuckle 81, the opposite end of which is pivotally connected by a pin 82 to any one of the closely spaced holes 83–85 through the lower end of an arm 86 if the switch assembly 42. By positioning one end of the spring 44 is a selective one of the holes 76–78 in the lever 74, and by selecting one of the holes 83–85 for pivotally connecting one end of the turnbuckle 81, an articulated linkage arrangement between the switch arm 86 and a rock shaft 67 may be provided whereby tension of the spring 44 is such as to position the rock shaft 67 and its follower pin 71 in any one of a predetermined number of positions.

An intermediate position of any one of the follower pins 71 may be called a hold position as determined by the relationship of the sensor follower assembly 41 and the linkage assembly 43. When one of the ground followers 47 drops into a depression of the ground, the respective follower pin 71 moves with the follower 47 downwardly. While one or more of the ground followers 47 remain in a raised position, the entire follower assembly 41 also remains in a raised position because any pin 71 in the raised position prevents the rock shaft 67 from rotating clockwise to lower the pin 71 until every lift projection 59 has been moved downwardly. However, should any follower 47 and its follower pin 71 be raised while the remaining followers are in a lower position, the rock shaft 67 rotates in a counterclockwise position from a lower position to a new position that is determined by the higher position to which the follower pin 71 has just been raised.

Should the rock shaft 67 rotate clockwise due to the downward movement of all of the ground followers 47, the lever 74 is rotated clockwise and the switch arm 86 for operating the switch assembly 42 is rotated counterclockwise. Conversely, a counterclockwise rotation of the rock shaft 67 due to movement of one or more of the ground followers 47 upwardly results in a counterclockwise rotation of the lever 74 and a clockwise rotation of the switch arm 86.

The switch assembly 42 also comprises a base 87 which is secured in a conventional manner by bolts to the side 89 of the header unit 11. A housing 91 of the switch is secured to the switch arm 86 by a plurality of screws 92; the housing is mounted on a shaft 93; and the shaft passes through the base 87 and is secured to the side 89 of the header.

As shown best in FIG. 3, the switch arm 86 has a substantially rectangular opening 94 therethrough intermediate its ends, and a pair of contact bars 96 and 97 are secured along the sides of the opening. Three upstanding poles or spring switch contacts 98, 99, and 100 each have one end secured to the switch arm 86 along a diagonal line between the contact bars 96 and 97 as shown in FIG. 3. Usually, the spring contacts are normal to the face of the arm 86 so that they are parallel unless they are engaged by the contact arms 96 and 97. Each pole or contact 98–100 is flexible relative to the base and to the adjacent contacts by means of a coil-type spring 101, the spring 101 extending between the contacts and stubs 102 that extend outwardly from the base 87. Therefore, each pole or contact can be readily flexed in any direction.

When the switch arm 86 is in a centered position, the spring contact 100 engages or leans against the bar 96, and the switch contact 98 engages or leans against the bar 97 while the spring switch contact 99 is centered between the contact bars 96 and 97. Referring to FIG. 3, when the switch arm 86 is rotated in a counterclockwise direction in response to rotation of the rock shaft 67 as the follower pins 71 are allowed to be moved downwardly by the downward movement of the ground followers 47, the left contact bar 96 not only engages the left spring contact 98, but it also engages the center contact 99. Further counterclockwise rotation of the switch arm 86 also brings the right contact 100 in engagement with the left contact bar 96. The number of spring contacts 98–100 engaged successively by the contact bars 96 and 97 for each direction of rotation determines the height at which the harvester header is positioned as described below.

In FIG. 2, the solenoid winding 108 of a hydraulic valve control assembly is connected by a wire 106 to the ignition switch 104 of the harvester that is to be controlled, and likewise the winding of a solenoid 109 is connected through a wire 107 to the switch. When the solenoid 108 is energized, it opens a metering valve (not shown) to permit hydraulic fluid to drain from a cylinder connected to the header such that the header is allowed to move to a lower level. When the solenoid 109 is energized, it operates a valve to apply hydraulic fluid under pressure to the cylinder and to raise the header. Since the hydraulic system for controlling the header is conventional, it is not shown in conjunction with the electrical control circuits.

The solenoids 108 and 109 are electrically connected by lines 112 and 113, respectively, to opposite side contacts 114 and 116 of the master control drum switch 12. In addition to being connected to the side contact 116, the wire 113 of the "raise" solenoid 109 is connected through a wire 118 to the contact bar 97 of the sensing switch 42. A side contact 119 opposite the contact 114 is connected through a wire 117 to the other contact bar 96 of the sensing switch. The upper contact 121 opposite the contact 116 of the drum switch 12 is connected to ground at a point 122. The side contacts 114 and 119 are interconnected by operation of the handle 13 of the drum switch 12 in one direction from an intermediate position, and the side contacts 116 and 121 are similarly interconnected in response to the operation of the handle 13 in opposite direction from an intermediate position. The three spring contacts 98, 99, and 100 mounted to the base 87 of the switch assembly 42, are connected by conductors 123, 124, and 126 to contacts 127, 128, and 129 of a height selector switch 131. The contacts 127–129 are selectively engaged by a manually rotatable arm 132 to connect a selected one of the spring contacts 98–100 to ground for determining the height at which the header will be automatically positioned with respect to ground.

Figure 4:
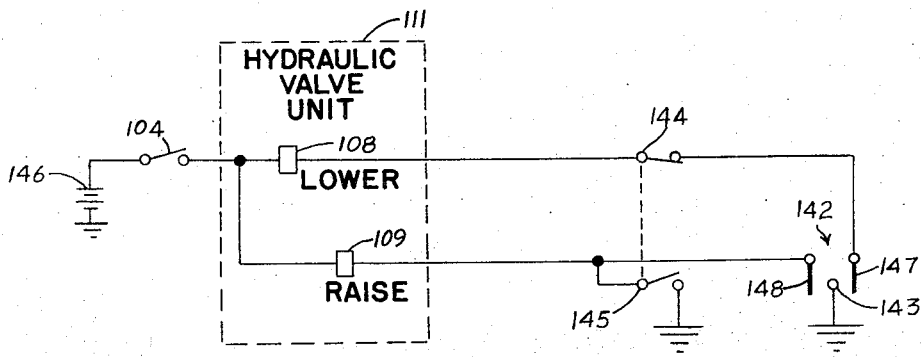
FIG. 4 is a simplified schematic diagram of the control circuit.

A simplified schematic diagram to aid in the understanding of the operation of the header control circuits is shown in FIG. 4, and a complete schematic diagram for fully explaining the operation of the circuit of FIG. 2 is shown in FIG. 5. In FIG. 4, the switch 142 having a single ground contact 143, has been substituted for the switch assembly 142 that has three contacts to be selected for height control as shown in FIG. 2. Compared with conventional control circuits, a pair of switch contacts 144 has been inserted in series between a contact bar 147 of the sensing switch 142 and a terminal of the winding of the solenoid 108 that is to be operated to lower the header of the harvester. Also, a pair of switch contacts 145 have been connected in parallel with the contact bar 148 of the sensing switch 142 and its ground contact 143. The bar 148 and the normally ungrounded contact of the switch 145 are connected to the winding of the solenoid 109 that is to be operated to raise the header of the harvester. The opposite terminals of the windings 108 and 109 are connected through the ignition switch 104 of the harvester to one terminal of a battery 146, and the other terminal of the battery 146 is connected to ground.

The manual operation of the switches 144 and 145 permit the header of the harvester to be raised to any desired height for either field operation or transportation and still the sensing switch 142 is always effective while the ignition switch 104 is closed to maintain the header at a safe distance above ground. This feature almost completely eliminates breakage due to the cutter of the harvester gouging the ground.

Normally, the pair of switch contacts 144 in series with the solenoid 108 for lowering the header is closed, and the pair of switch contacts 145 that is connected to ground and to the winding 109 of the solenoid for raising the harvester is open. While the header unit 11 of FIG. 1 is at a desired predetermined height, the bars 147 and 148 of the sensing switch that is coupled to the rock shaft 72 are in an intermediate position so that neither one engages the contact 143 that is connected to ground. When the rock shaft 72 of FIG. 1 is rotated in response to one of the ground followers 47 being moved upwardly, the bar contact 148 that corresponds to one of the bars of the switch assembly 42 engages the grounded contact 143 to complete a circuit from ground through the contacts 143 and 148 of the switch 142, the winding of the solenoid 109, the closed ignition switch 104, and the battery 146 to ground. The header 11 is therefore raised until the follower 147 that has been moved upward returns to a lower position to cause the rock shaft 72 to rotate until the contact bar 148 no longer engages the grounded contact 143.

In a like manner, if all of the ground followers 147 are moved to a lower position, the rock shaft 72 rotates in the direction for engaging the contact bar 147 with the grounded contact 143. Then, a circuit is completed from ground through the contacts 143 and 147 of the sensing switch 142, the closed pair of contacts 144, the winding of the solenoid 108 that is energized to permit the header 11 to move to a lower position, the closed ignition switch 104, and through the battery 146 to ground.

To control the height of the header 11 manually, the switch contacts 144 and 145 that correspond to contacts of the header master control switch 12 of FIG. 2 are operated such that the pair of contacts 144 in the circuit for lowering the header automatically is opened and the pair of contacts 145 that is in the circuit for raising the header is closed. Then a circuit is completed from ground through the pair of contacts 145, the winding of the solenoid 109, through the closed ignition switch 104. To maintain the header at the new height that has been selected manually, the pairs of switch contacts 144 and 145 are both operated to an open position. However, regardless of the position of the pair of contacts 145, the bar contact 148 of the sensing switch 142 is connected as a safety feature so that the header 11 is always raised automatically a safe distance above ground in the event that the header has been adjusted manually to a height that is not sufficient to clear surface that is higher than that anticipated by the operator. When the operator wishes to lower the header after it has been raised by manual control and the master control switch has been operated to a HOLD position, the master control switch is operated to an AUTOMATIC position. The header can then be lowered only as far as it is permitted by the position of the height control adjustment.

The circuit of FIG. 2 is shown schematically in FIG. 5. For simplicity, both the control switch 12 and the sensing switch 42 of FIG. 2 have been shown as familiar wafer switches that provide similar switching sequences. The control knob 154 of FIG. 5 corresponds to the control lever 13 of the controller 12 of FIG. 2, and when the control knob 154 is operated to the HOLD position, the blade 153 of the header control switch 12' is positioned between the contacts of the switch so that all contacts of the switch are open. The circuit then functions as described above for FIG. 4 to hold the header 11 of the harvester in a fixed position unless it encounters a higher surface than the operator anticipated. When the knob 154 of the switch 12' is turned to the RAISE position, the blade 153 engages both the contacts 149 and 150 to complete a circuit as described above for energizing the solenoid 109 to raise the header 11. When the header control switch knob 154 is operated to the AUTOMATIC position, the switch blade 153 is positioned to engage contacts 151 and 152 such that a circuit is completed from the windings of both the solenoids 108 and 109 to the automatic control switch 42'. Three consecutive contacts 155, 156, and 157 of the switch 42' are connected to successive contacts of switch 131 that is used for height adjustment. When the header 11 is at a desired height, the rotor of the switch 42' is positioned such that a space between the blades 158 and 159 is positioned opposite one of the contacts 155–157 that is connected to ground through the height control switch 131.

The function of the height control 131 as shown in FIG. 5 but omitted in FIG. 4 can be understood by tracing the circuit of FIG. 5 for different positions of the rotor of the switch 42' and the height control switch 131 while the header control switch 12' is in its automatic position. As shown in FIG. 1, when any feeler member 71 encounters a raised surface, the rock shaft 67 and the lever 86 are rotated in the direction to cause the contact bar 97 of FIGS. 1-3 to engage the grounded ones of the spring contacts 98-100. In FIG. 5, the corresponding operation is obtained on the wafer switch when the rotor is rotated clockwise until the blade 160 engages the contact 157 that is connected to ground through the height control switch 131. The solenoid 109 would then be energized through a circuit that can be traced from ground through the switch 131, the contact 157 and the blade 160 of the switch 42', to the winding of the solenoid 109. In response to the operation of the solenoid 109, the hydraulic valve unit 111 is operated to raise the header 11. Assume that the arm of the height control switch 131 is engaging the contact 164 that corresponds to the lowest position of the header, then the header will be raised until the rotor of the switch 42' is positioned so that the contact 157 is within the gap between the rotor blades 160 and 161. With reference to FIG. 1, the header is raised until the bar 97 does not engage the spring contact 100.

Obviously, if the rotor of the height control switch 131 is positioned to engage its contact 163 for grounding contact 156 of the height control switch 42', space between the switch blades 160 and 161 would be positioned opposite the contact 156 sooner than it would be positioned opposite the contact 157 so that the header 11 would not be raised as high as when the arm of the height control switch 131 was positioned to engage contact 164. Likewise, when the arm of the height control switch 131 is set to engage its contact 162, the electrical circuit for energizing the winding of the solenoid 109 will be interrupted still sooner to maintain the header at a still lower position. Referring to FIG. 1, at the lowest setting, the arm 86 of the switch assembly 42 will be rotated until the contact bar 97 no longer engages the spring contact 98.

The operation to lower the header is somewhat similar except that the initial movement of the ground feelers 47 to follow ground is in the opposite direction and the rotor of the switch 42' is rotated in the opposite direction. For example, when the arm of the height control switch 131 is set to engage the contact 164 for grounding contact 157 that corresponds to the highest position, then in response to all of the ground feelers 47 being moved downwardly, the rotor of the automatic control switch 42' is rotated counterclockwise and the blade 161 engages the contact 157. A circuit for lowering the header can be traced from ground through contact 164 of the height control switch 131, contact 157 and blade 161 of the automatic control switch 42', the contacts 151 and 152 of the header control switch to the winding of the solenoid 108 that controls the lowering of the header. The header is lowered and causes the rotor of the switch 42 to rotate clockwise until the circuit through the switch is opened. When the arm of the switch 131 in engagement with either contact 162 of 163 rather than contact 164, the rotor of the switch 42' would had to have been rotated farther to open the circuit through the switch and therefore the header would have been in a lower position before the circuit to the solenoid 108 is opened.

I claim:

1. In a harvester having a harvesting head and automatic header control apparatus including a pivotal sensor member in engagement with the ground, said automatic header control apparatus having first and second windings and switching means for selectively energizing said windings, said automatic header control apparatus responding to the energization of said first winding to raise said cutting head and responding to the energization of said second winding to lower said cutting head, said switching means including a sensing switch in an operative relationship with said sensor member, said sensing switch having a normally open first switching circuit connected to said first winding and a normally open second switching circuit connected to said second winding, said first switching circuit closing in response to movement of said sensor member as said cutting head becomes substantially lower than a predetermined level above the ground and said second switching circuit closing in response to movement of said sensing member as said cutting head becomes substantially higher than said predetermined level above ground, a manual header control switch having first and second switching elements connected in said first and second switching circuits respectively, said header control switch being operable to a RAISE position, a HOLD position, and an AUTOMATIC position, said header control switch in said RAISE position operating said first switching element to close said first switching circuit regardless of the operation of said sensor member and operating said second switching element to disable said second switching circuit, said header control switch in said HOLD position also operating said second switching element to disable said second switching circuit while said first switching circuit is enabled to be closed in response to operation of said sensor member as described above and, said header control switch in said AUTOMATIC position operating said second switching element to enable said second switching circuit to be closed in response to operation of said sensor member as described above while said first switching circuit is still enabled to be closed in response to operation of said sensor member as described above.

2. In a harvesting head automatic header control apparatus as claimed in claim 1 wherein said first switching element of said manual header control switch is a first pair of switching contacts connected in parallel with said first switching circuit and said second switching element is a second pair of switching contacts connected in series in said second switching circuit, said header control switch being operable to said RAISE position for closing its first pair of contacts and opening its second pair of contacts, said header control switch being operable to said AUTOMATIC position for opening its first pair of contacts and closing its second pair of contacts and, said header control switch being operable to said HOLD position for opening both its first and second pairs of contacts.

3. In a harvester having an automatic header control apparatus as claimed in claim 1 wherein said sensing switch has first and second movable contact means and a plurality of fixed contacts, said first movable contact means being connected in said first switching circuit and said second movable contact means being connected in said second switching circuit, said fixed contacts being engaged in successive order by said first movable contact means in response to said sensor member being moved in one direction and being engaged in reverse successive order by said second movable contact means in response to said sensor member being operated in an opposite direction, and height control switching means connected to said fixed contacts for completing said first and second circuits through a selected one of said fixed contacts, each of said fixed contacts when selected determining a different predetermined level above ground at which said cutting head is to be positioned automatically, and said height control switching means operable to select a desired one of said fixed contacts to complete said final switching circuit in response to said first movable contact means engaging said selected fixed contact as said cutting head becomes lower than said predetermined level and to complete said second switching circuit in response to said second movable contact means engaging said selected fixed contact as said cutting head becomes higher than said predetermined level.

4. In a harvester having an automatic header control apparatus as claimed in claim 3 wherein said sensing switch has a base on which said fixed contacts are mounted, said fixed contacts being poles flexibly mounted in an upstanding position and capable of returning to said upstanding position after being displaced therefrom, an arm pivotally mounted on said base and having an opening through which said poles extend, said poles being arranged on said base so that they are on a slanting line across said opening, and said movable contact means including a pair of bar contacts positioned on opposite sides of said opening.

* * * * *